United States Patent
Xie et al.

(10) Patent No.: US 11,746,194 B2
(45) Date of Patent: Sep. 5, 2023

(54) METHOD FOR PREPARING TOPOLOGICAL ELASTOMERS WITH HIGHLY BRANCHED STRUCTURES, LOW MODULUS AND HIGH ELASTICITY

(71) Applicant: ZHEJIANG UNIVERSITY, Zhejiang (CN)

(72) Inventors: Tao Xie, Zhejiang (CN); Ning Zheng, Zhejiang (CN); Xiaona Xu, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 535 days.

(21) Appl. No.: 16/888,870

(22) Filed: Jun. 1, 2020

(65) Prior Publication Data

US 2021/0317273 A1 Oct. 14, 2021

(30) Foreign Application Priority Data

Apr. 13, 2020 (CN) .......................... 202010285075.4

(51) Int. Cl.
| | |
|---|---|
| C08G 83/00 | (2006.01) |
| C08F 290/02 | (2006.01) |
| C08F 297/02 | (2006.01) |
| C08J 3/24 | (2006.01) |
| C08L 101/02 | (2006.01) |
| C08L 101/08 | (2006.01) |

(52) U.S. Cl.
CPC .......... C08G 83/003 (2013.01); C08F 290/02 (2013.01); C08F 297/02 (2013.01); C08J 3/24 (2013.01); C08L 101/025 (2013.01); C08L 101/08 (2013.01); C08G 2270/00 (2013.01)

(58) Field of Classification Search
CPC . C08G 83/003; C08G 2270/00; C08L 101/08; C08L 101/025; C08F 297/02; C08F 290/02; C08J 3/24
USPC ........................................................ 524/504
See application file for complete search history.

(56) References Cited

U.S. PATENT DOCUMENTS

2006/0058488 A1* 3/2006 Kuhnle ................ C08K 5/0025
528/37
2019/0092938 A1 3/2019 Kennedy et al.

FOREIGN PATENT DOCUMENTS

| CN | 1772357 | 5/2006 |
| CN | 107674158 | 2/2018 |
| WO | 2017015614 | 1/2017 |

* cited by examiner

*Primary Examiner* — Hui H Chin
(74) *Attorney, Agent, or Firm* — Jiwen Chen; Joywin IP Law PLLC

(57) ABSTRACT

A fabrication method and application of topological elastomers with highly branched structures, low modulus and high elasticity. The topological elastomers comprise dendritic macromolecules. The fabrication method includes direct crosslinking, post-crosslinking, grafting, and copolymerization. The performance of the elastomer can be easily tuned via changing the topology of the polymer network. The breakthrough of this invention lies in that these topological elastomers with highly branched structures are having low modulus and high elasticity, which would expand its application in the field of elastomer. Notably, the variety of topological elastomers, the versatility of curing chemistries, the availability of a wide variety of monomers, and the various polymerization methods are enabling the fabrication of topological elastomers with feasibility and efficiency.

18 Claims, 2 Drawing Sheets

(1)

(2)

(3)

～～ Polymer chains ◆ ◖ ◀ Different functional groups
● ▦ Different dendritic macromolecules (1)

(2)

METHOD FOR PREPARING TOPOLOGICAL ELASTOMERS WITH HIGHLY BRANCHED STRUCTURES, LOW MODULUS AND HIGH ELASTICITY

CROSS-REFERENCE TO RELATED APPLICATION

This application claims the priority benefit of China application serial no. 202010285075.4, filed on Apr. 13, 2020. The entirety of the above-mentioned patent application is hereby incorporated by reference herein and made a part of this specification.

BACKGROUND OF THE INVENTION

1. Technical Field

The present invention relates to the field of fabrication and application of topological elastomers with highly branched structures, and more particularly, relates to the methods for preparing the elastomers with both low modulus and high elasticity.

2. Description of Related Art

Elastomers with low modulus and high elasticity simultaneously have wide application prospects in the field of biomedical materials, intelligent robots, aerospace, etc. However, there is a dilemma to obtain such materials with low modulus and high elasticity. The modulus of the elastomer can decrease by reducing the crosslinking density and the physical entanglement of the network. When the crosslinking density and the physical entanglement of the network are reduced to a certain extent, the elastomer is prone to creep and thus diminishing the elasticity. Therefore, there is an inherent contradiction between the low modulus and high elasticity of polymer materials. The most common materials with both low modulus and high elasticity are polymer gels, but a large amount of solvents in the gels will bring many negative effects, such as phase separation, solvent evaporation, leakage, etc. To achieve the properties of low modulus and high elasticity without solvent, Sheiko et al. synthesized a type of highly branched elastomers with the specific bottle and comb topological structures (International patent, international publication number: WO 2017/015614 A), but the synthetic routes are rather complicated and the applicable chemicals are limited. In contrast, polymers with highly branched structures are having diverse structures, a wide choices of monomers, and various polymerization methods. Therefore, the present application proposes a type of elastic topological elastomers with highly branched structures, and low modulus and high elasticity.

It is well-known that the network topology will affect the properties of elastomers. For example, topological defects will greatly influence the mechanical properties of materials. Topological elastomer refers to the elastomer with a specific topological structure that plays a dominant/determining role in material properties. Different from traditional linear, branched, and crosslinked polymers, dendritic polymers possess lots of terminal functional groups and nearly zero physical entanglements that results in the advantages of low viscosity, high solubility, and high reactivity. Thus, they are widely used as non-crosslinked additives in the fields of material surface modification, polymer separation, biological drug delivery, etc. These applications are mainly focused on non-crosslinked macromolecules. Although some studies currently focus on crosslinked dendritic polymers (for example, Chinese patent, publication number: CN 107674158A; Chinese patent, publication number: CN 1772357A), these studies mainly focus on cross-linked gel materials with hyperbranched structures or crosslinked hyperbranched molecules as polymer additives for membrane materials, but studies on highly branched elastomers are still rare. Kennedy et al. prepared a bulk material with hyperbranched structures using a physical crosslinking method (U.S. patent, publication number: US 2019/0092938 A1). They synthesized thermoplastic elastomers based on block copolymers-hyperbranched styrene block copolymers. Although these materials have high elasticity, the modulus of such thermoplastic elastomers is constrained by the rigid molecular chain of polystyrene. Thus, it is difficult to prepare elastomer with both low modulus and high elasticity, especially for crosslinked polymers.

SUMMARY OF THE INVENTION

The present invention provides a method for preparing topological elastomers with highly branched structures, low modulus and high elasticity. The prepared topological elastomers with low modulus can be realized while maintaining its high elasticity.

The technical solution of the present invention are as follows.

A method for preparing a topological elastomer with highly branched structure, low modulus and high elasticity, in which the topological elastomer comprises dendritic macromolecules. The preparation method may be direct crosslinking, post-crosslinking, grafting, or copolymerization. Direct crosslinking refers to mixing all monomers and reacting the mixture together, and the crosslinking reaction and the highly branched structure formation reaction are performed simultaneously, to obtain the topological elastomer directly. The post-crosslinking refers to firstly synthesizing a dendritic macromolecule followed by crosslinking the dendritic macromolecule with crosslinking agent to obtain a topological elastomer. The grafting refers to grafting unreacted monomers or pre-prepared dendritic macromolecules into a polymer network to form a topological elastomer. The copolymerization refers to copolymerizing unreacted monomers or pre-prepared dendritic macromolecules with a polymer network to form a topological elastomer with a single network or a double network/interpenetrating network.

It should be pointed out that, dendritic macromolecules comprise, but are not limited to, structures as shown below, which are dendrimer, hyperbranched polymer, dendritic grafted polymer, linear-dendritic polymer, and dendritic-block polymer, respectively. Dendrimer and hyperbranched polymer are the two of the most common dendritic macromolecules. The dendrimer is perfectly symmetrical and the terminal functional groups are evenly distributed while the hyperbranched polymer is asymmetric and the branched structure is randomly distributed.

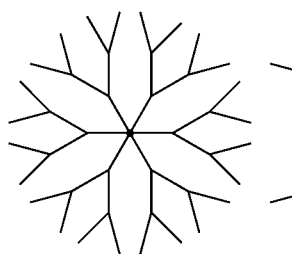
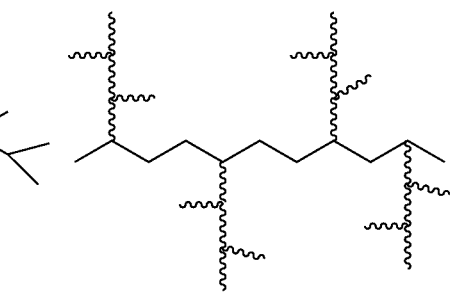

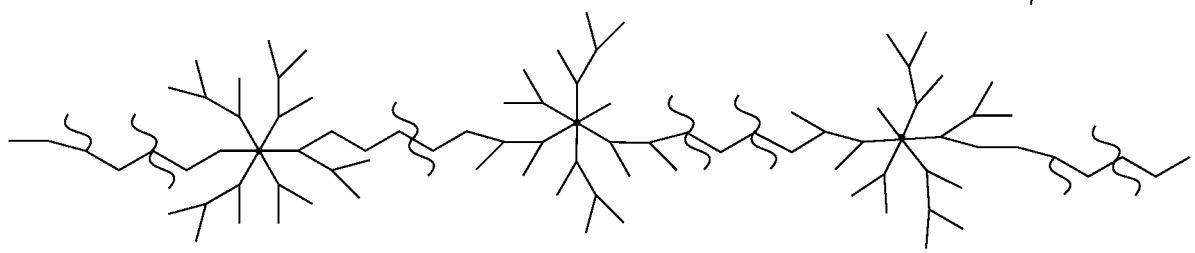

Preferably, the terminal functional group of the dendritic macromolecules can be selected from amino group, hydroxyl group, allyl group, vinyl group, (meth)acrylate group, thiol group, epoxy group, carboxyl group, anhydride group, silicon-hydrogen bond, alkoxy group, isocyanate group, etc.

Regarding the Direct Crosslinking of the Present Invention

The direct crosslinking refers to mixing all monomers and reacting the mixture together, and the crosslinking reaction and the highly branched structure formation reaction are performed simultaneously, to obtain the topological elastomer directly. It should be noted that since the crosslinking reaction and the highly branched structure formation reaction are performed simultaneously, the crosslinking reaction and the highly branched structure formation reaction have to be two orthogonal reactions that do not interfere with each other.

Preferably, the two orthogonal reactions are respectively selected from, but not limited to, radical polymerization, cationic polymerization, anionic polymerization, coordination polymerization, and functional group reaction.

More preferably, 0.01 wt % to 5 wt % of initiator should be added in the network of radical polymerization, cationic polymerization, and anion polymerization. For instance, free radical polymerization requires the addition of photoinitiator or thermal initiator, and the polymerization is conducted under ultraviolet irradiation for 10 s to 10 min or heated to 80-120° C. Initiator includes photoinitiator 819, photoinitiator 2959, dibenzoyl peroxide, azodiisobutyronitrile, etc.

Preferably, the functional group reactions comprise, but are not limited to, Michael addition reaction of thiol/amino-ene, amine/carboxyl/anhydride-epoxy reaction, amino/hydroxy-isocyanate reaction, hydrosilylation reaction, esterification reaction, etc.

More preferably, 0.01 wt % to 5 wt % of base catalyst should be added to Michael addition reaction of thiol/amino-ene. The polymerization is conducted under 60-120° C. Base catalyst includes triethylamine, 1,5,7-triazabicyclo[4.4.0]decane-5-ene, 1,8-diazabicyclo[5.4.0]undec-7-ene, etc.

Even more preferably, the highly branched structure can be prepared by a reaction of hydroxyl group with isocyanate group (Reaction Formula I), and the crosslinked network can be obtained by a radical polymerization reaction of (meth)acrylate group (Reaction Formula II).

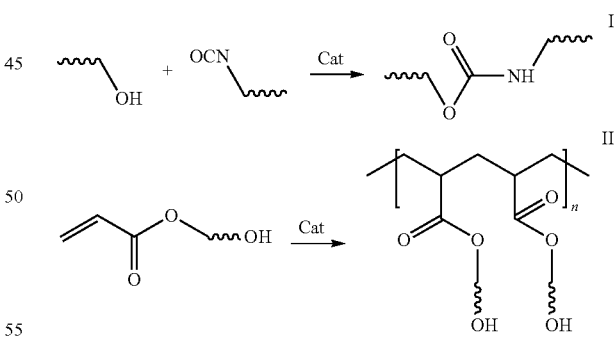

Regarding the Post-Crosslinking of the Present Invention

The post-crosslinking refers to firstly synthesizing a dendritic macromolecule followed by crosslinking the dendritic macromolecule with crosslinking agent to obtain a topological elastomer. It includes the following two steps:

(1) Preparation of a dendritic macromolecule with a highly branched structure by conventional methods;

(2) Crosslinking the prepared dendritic macromolecules with crosslinking agent to form a topological elastomer.

According to the crosslinking agent selection, the post-crosslinking is divided into the following three categories:

using other micromolecules/macromolecules as a crosslinking agent to react with dendritic macromolecules to form topological elastomers; using the pre-prepared dendritic macromolecules as a crosslinking agent to form topological elastomers by self-polymerization; using a pre-prepared dendritic macromolecules with different terminal functional groups as a crosslinking agent to crosslink through functional group reaction to form topological elastomers.

Preferably, the functional group reactions of other micromolecule/macromolecule crosslinking agent with dendritic macromolecules include, but are not limited to, Michael addition reaction of thiol/amino-ene, amine/carboxyl/anhydride-epoxy reaction, amino/hydroxy-isocyanate reaction, hydrosilylation reaction, esterification reaction, etc.

More preferably, the above topological elastomers can be obtained by reacting a dendritic macromolecule containing vinyl group, epoxy group, and silicon double bond with a micromolecule/macromolecule crosslinking agent containing thiol/amino group, amino group, and silicon hydroxyl group, respectively (Reaction formula III).

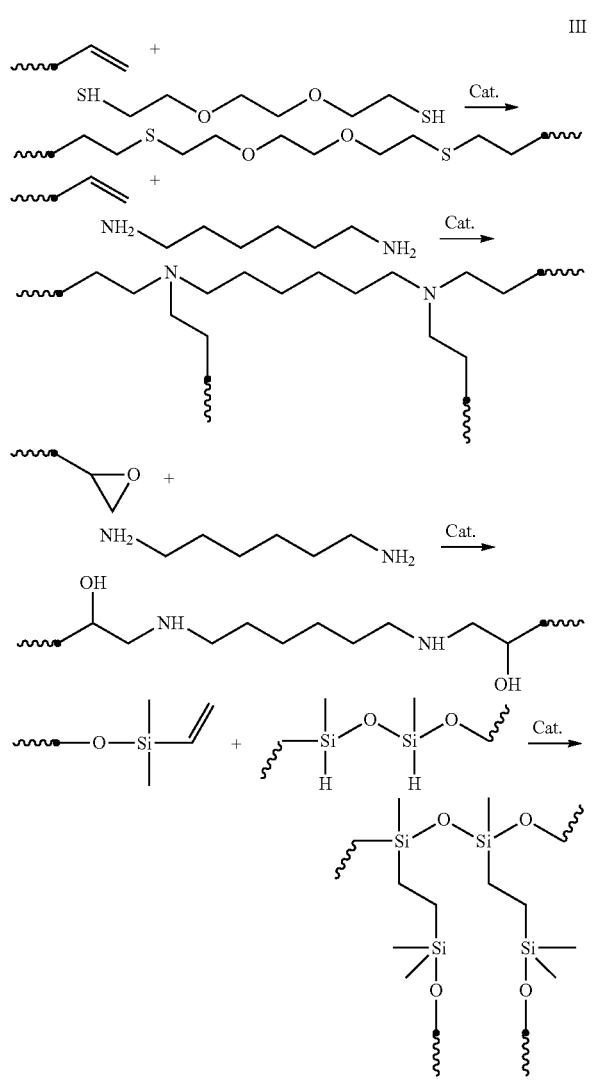

Even more preferably, 0.01 wt %-5 wt % of platinum catalyst should be added to the reaction of silicon double bond and silicon hydrogen group. The polymerization is conducted thermally at 60-120° C.

Preferably, the self-polymerization of the dendritic polymer includes, but is not limited to, free radical self-polymerization, cationic self-polymerization, anionic self-polymerization, and coordination polymerization.

More preferably, the above topological elastomer can be obtained by radical polymerization of the dendritic macromolecules containing (meth)acrylate group as the terminal functional group (Reaction formula IV).

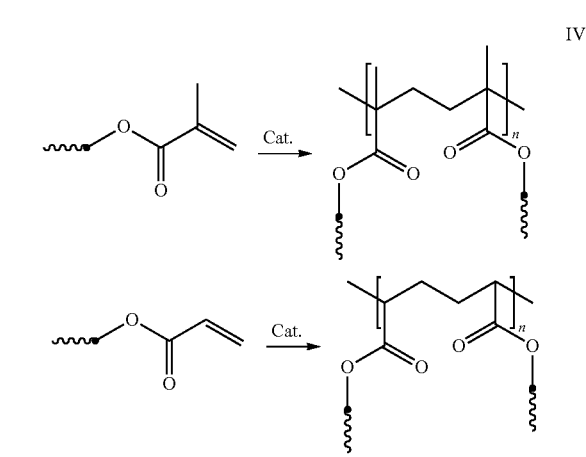

Preferably, the functional group reactions of dendritic macromolecules with different terminal functional groups comprise, but are not limited to, Michael addition reaction of thiol/amino-ene, amine/carboxyl/anhydride-epoxy reaction, amino/hydroxy-isocyanate reaction, hydrosilylation reaction, esterification reaction, etc.

More preferably, the above topological elastomer can be obtained by the reacting dendritic macromolecules with terminal functional groups of amino and acrylate groups, thiol and acrylate groups, amino and epoxy groups, respectively (Reaction Formula V).

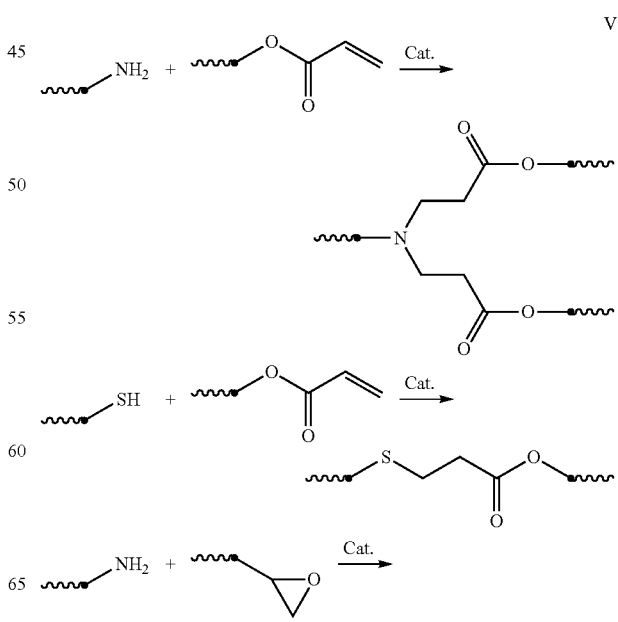

-continued

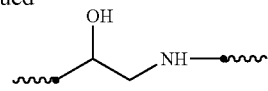

Regarding the Grafting of the Present Invention

Grafting refers to grafting unreacted monomers or dendritic macromolecules into a polymer network to form a topological elastomer, which is divided into the following two categories: (1) grafting of unreacted monomers to the polymer network, wherein the crosslinking and the formation of the dendritic marcomolecules are performed simultaneously during grafting, and thus obtaining a topological elastomer; (2) grafting the pre-prepared dendritic macromolecules into the polymer network, wherein the dendritic macromolecules is grafted into the polymer network by taking the advantages of the low viscosity and high viscosity of the dendritic macromolecules, and thus forming a topological elastomer.

Preferably, the grafting and polymerization reactions include all the reactions mentioned above. The polymer networks include, but are not limited to, epoxy resin network, polyurethane network, silicone rubber network, polyester network, polyacrylate network, etc.

More preferably, 0.01 wt %-5 wt % of catalyst should be added to system when the polyurethane network is selected. The polymerization is conducted thermally at 60-120° C. The catalyst includes stannous octoate, dibutyltin dilaurate, triethylamine, etc.

Regarding the Copolymerization of the Present Invention

The copolymerization refers to copolymerizing unreacted monomers or dendritic macromolecules with a polymer network to form a topological elastomer with a single network or a double network/interpenetrating network, which is divided into the following two categories: copolymerizing unreacted monomers with a polymer network wherein dendritic macromolecules are formed during polymerization, and thus forming a topological elastomer; copolymerizing the dendritic macromolecules with a polymer network to form a topological elastomer.

Preferably, the copolymerization of the dendritic macromolecules and the polymer network can form a double network or an interpenetrating network; the stepwise copolymerization of the dendritic macromolecules and the polymer network can form a block network.

Preferably, the polymerization reactions and the polymer networks include all the chemical reactions and the polymer networks mentioned above.

The topological elastomers prepared by the present invention can achieve low modulus while maintaining its high elasticity.

In the present application, topological elastomers with highly branched structures refer to a class of elastomers formed by chemically crosslinked dendritic macromolecules.

Compared with the prior art, the advantageous effects of the present invention are:

(1) In the present invention, the topological elastomers with a highly branched structure obtained by chemical crosslinking of dendritic macromolecules, are having low modulus and high elasticity, which would expand its application in the field of elastomer;

(2) In the present invention, the variety of topological elastomers, the versatilities of curing chemistries, the availability of a wide variety of monomers, and the various polymerization methods are enabling the fabrication of topological elastomers with feasibility and efficiency. By having low equipment requirement, application of the topological elastomer is expected to be expand in the field;

(3) In the present invention, the topological elastomers may also have some additional characteristics that worth attention. Due to less chain entanglement in the system, it may also have characteristics of fast rebound capacity, low rebound hysteresis loss, etc.; and due to many unreacted active functional groups in the system, it may also have characteristics of high adhesion, ultrahigh/ultralow surface energy, ultra-hydrophobic/ultra-hydrophilic properties, etc.

DETAILED DESCRIPTION OF THE INVENTION

This invention will be described in further detail regarding the following implementation examples. It should be noted that the examples mentioned below are aimed to facilitate the understanding of this invention. The invention, however, demands protection of practice more than these examples.

Figure 1:
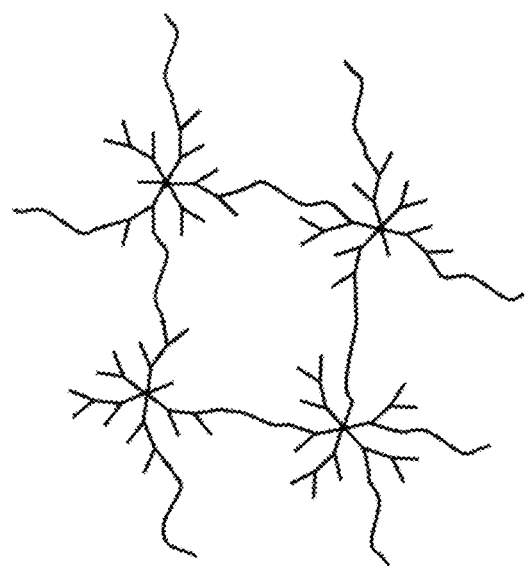
FIG. 1 is a schematic diagram of the network structure of a typical topological elastomer.
Figure 2:
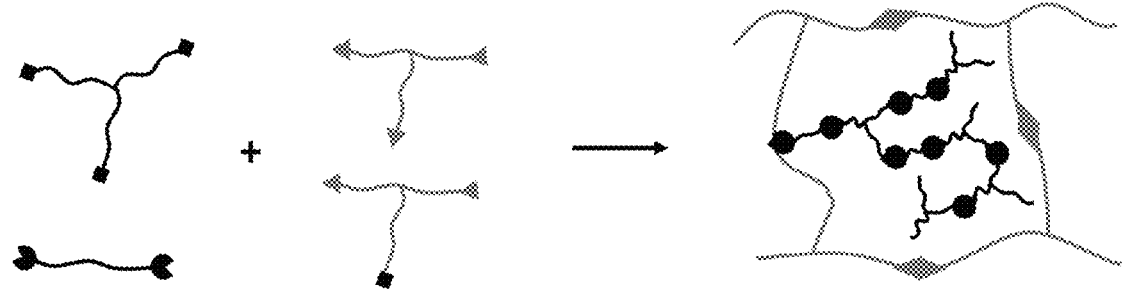
FIG. 2 is the schematic diagram of direct crosslinking.
Figure 3:
FIG. 3 is the schematic diagram of post-crosslinking.
Figure 3:
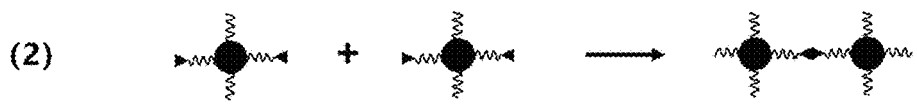
Figure 3:
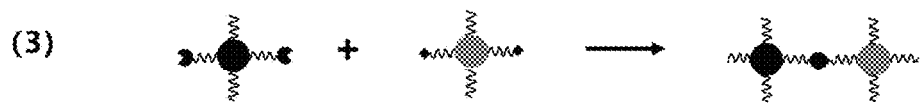
Figure 4:
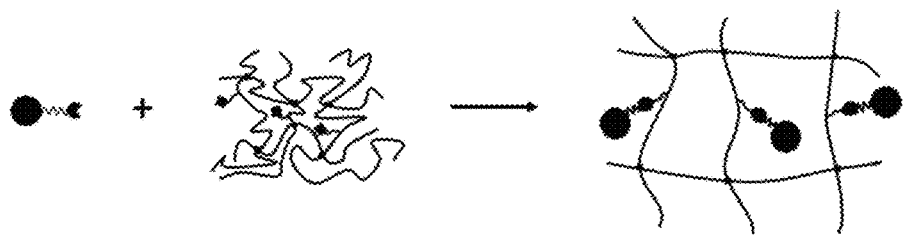
FIG. 4 is the schematic diagram of grafting.
Figure 5:
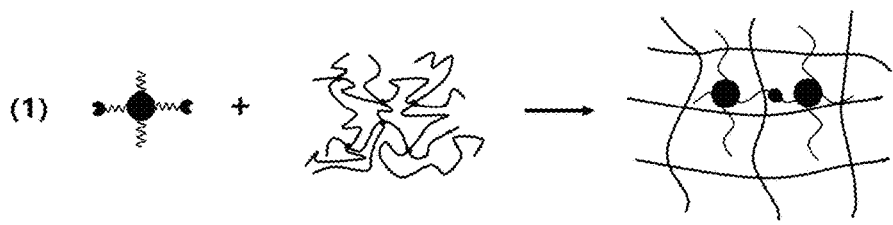
FIG. 5 is the schematic diagram of copolymerization.
Figure 5:
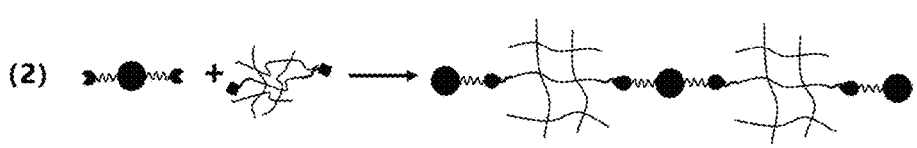

A typical topological elastomer with highly branched structures that possess not only low modulus but also high elasticity is shown in FIG. 1. The schematic diagram of direct crosslinking is shown in FIG. 2. The post-crosslinking processes that using other micromolecules/macromolecules, the pre-prepared dendritic polymers, and another dendritic polymer with the different terminal functional groups as crosslinking agents, are shown in FIG. 3 respectively. The schematic diagram of grafting is shown in FIG. 4. The topological elastomers that contain a double network/interpenetrating network and block network are shown in FIG. 5.

Example 1 (Direct Crosslinking for Preparation of Topological Elastomers)

The raw materials and sources of Example 1 are shown in Table 1:

TABLE 1

The raw materials and sources.

| Name | Chemical Formula | Manufacturer |
| --- | --- | --- |
| Hexamethylene diisocyanate (HDI) | $C_8H_{12}N_2O_2$ | J&K Scientific |
| Polycaprolactone triol (PCL) | $C_2H_5C[CH_2O[CO(CH_2)_5O]_nH]_3$ | Sigma-Aldrich (China) |
| Ditin butyl dilaurate (DBTDL) | $C_{32}H_{64}O_4Sn$ | J&K Scientific |
| Pentaerythritol triacrylate (PETA) | $C_{14}H_{18}O_7$ | Sigma-Aldrich (China) |
| 2,2'-Azobis(2-methylpropionitrile) (AIBN) | $C_8H_{12}N_4$ | J&K Scientific |
| n-Butyl acetate | $C_6H_{12}O_2$ | J&K Scientific |

Preparation of Topological Elastomer:

The samples were weighed according to the ratio of PCL:PETA:HDI=1:0.5:1 (molar ratio), and dissolved in an appropriate amount of butyl acetate. Then 0.5 wt % of DBTDL and 1 wt % of AIBN were added. After being stirred evenly, the mixture was poured into a mold and reacted under 70° C. for 3 hours. After the solvent was evaporated in a vacuum oven, a crosslinked topological elastomer could be obtained.

The mechanical properties of the resulting topological elastomer were measured using a universal material testing machine. The modulus, strain at break, and elastic recovery were calculated from the stress-strain curve. The modulus, strain at break, and elastic recovery of the resulting topological elastomer were 150 kPa, 800%, 90%, respectively. The branched degree was calculated from the concentration of the monomers by using the formula, branched degree=($\Sigma$ branched units+$\Sigma$ end unit)/$\Sigma$ repeat unit. The branched degree was 60%.

Example 2 (Post-Crosslinking, Self-Polymerization of Dendritic Macromolecules in the Formation of Topological Elastomers)

The raw materials and sources of Example 2 are shown in Table 2:

TABLE 2

The raw materials and sources.

| Name | Chemical Formula | Manufacturer |
|---|---|---|
| Triallylamine | $C_9H_{15}N$ | TCI (Shanghai) Development Co., Ltd. |
| β-mercaptoethylamine | $C_2H_7NS$ | TCI (Shanghai) Development Co., Ltd. |
| Allyl acrylate | $C_6H_8O_2$ | Shanghai Aladdin Biochemical Technology Co., Ltd |
| Glycidyl methacrylate | $C_7H_{10}O_3$ | TCI (Shanghai) Development Co., Ltd. |
| Triethylamine (TEA) | $C_6H_{15}N$ | TCI (Shanghai) Development Co., Ltd. |
| Photoinitiator 2959 | $C_{12}H_{16}O_4$ | TCI (Shanghai) Development Co., Ltd. |

Preparation of Dendritic Macromolecules with Methacrylate Group as the Terminal Functional Group:

1. The samples were weighed and mixed according to the ratio of triallylamine to allyl acrylate at 1:6 (molar ratio). In the presence of 5 wt % TEA as a catalyst, the mixture was stirred evenly and reacted for 1 h;

2. Then, the same molar amount of β-mercaptoethylamine as the allyl acrylate, 1 wt % of photoinitiator 2959 was added into the mixture. The β-mercaptoethylamine was dissolved while reacting under the irradiation of ultraviolet light at 365 nm and heating at 40° C.;

3. After the β-mercaptoethylamine was completely reacted, adding 2 times amount of the allyl acrylate added in step 1, and step 1 was repeated;

4. 2 times amount of the β-mercaptoethylamine added in step 2 were added into the mixture, and step 2 was repeated;

5. 4 times amount of the allyl acrylate added in step 1 were added into the mixture, and step 1 was repeated;

6. 4 times amount of the β-mercaptoethylamine added in step 2 were added into the mixture, and step 2 was repeated;

7. Glycidyl methacrylate in an equimolar amount to β-mercaptoethylamine of step 6 was added into the mixture, followed by reacting at 80° C. for 1 h.

After steps 1-6, a dendritic macromolecule with amino group as the terminal functional group was prepared. After that, the amino group of the terminal functional group was transformed into methacrylate group through step 7

Preparation of Topological Elastomer:

1 wt % of photoinitiator 2959 was added to the obtained dendritic macromolecules with methacrylate group as the terminal functional group. After being stirred uniformly, the mixture was poured into a mold, followed by crosslink curing under UV light at 365 nm for 1 minute to obtain a topological elastomer. The modulus, strain at break, and elastic recovery of the resulting topological elastomer were 100 kPa, 1000%, 85%, respectively. The branched degree was 80%.

Example 3 (Post-Crosslinking, Copolymerization of Two Dendritic Macromolecules in the Formation of Topological Elastomers)

The raw materials and sources of Example 3 are shown in Table 3:

TABLE 3

The raw materials and sources.

| Name | Chemical Formula | Manufacturer |
|---|---|---|
| Triallylamine | $C_9H_{15}N$ | TCI (Shanghai) Development Co., Ltd. |
| β-Mercaptoethylamine | $C_2H_7NS$ | TCI (Shanghai) Development Co., Ltd. |
| Allyl acrylate | $C_6H_8O_2$ | Shanghai Aladdin Biochemical Technology Co., Ltd |
| Glycerol | $C_3H_8O_3$ | TCI (Shanghai) Development Co., Ltd. |
| Monothioglycerol | $C_3H_8O_2S$ | TCI (Shanghai) Development Co., Ltd. |
| 2-Isocyanatoethyl acrylate | $C_6H_7NO_3$ | Shanghai Aladdin Biochemical Technology Co., Ltd |
| n-Hexane | $C_6H_{14}$ | Sinopharm Chemical Reagent |
| Methanol | $CH_4O$ | Sinopharm Chemical Reagent |
| Anhydrous diethyl ether | $C_2H_6O$ | Sinopharm Chemical Reagent |
| Dichloromethane (DCM) | $CH_2Cl_2$ | Sinopharm Chemical Reagent |
| Dimethyl sulfoxide (DMSO) | $C_2H_6OS$ | Sinopharm Chemical Reagent |
| Triethylamine (TEA) | $C_6H_{15}N$ | TCI (Shanghai) Development Co., Ltd. |
| Photoinitiator 2959 | $C_{12}H_{16}O_4$ | TCI (Shanghai) Development Co., Ltd. |

Preparation of Dendritic Macromoplecules with Amino Group as Terminal Functional Group:

1. The samples were weighed and mixed according to the ratio of triallylamine to allyl acrylate at 1:6 (molar ratio). In the presence of 5 wt % TEA as a catalyst, the mixture was stirred evenly and reacted for 1 h;

2. Then, the same molar amount of β-mercaptoethylamine as the allyl acrylate, 1 wt % of photoinitiator 2959 was added into the mixture. The β-mercaptoethylamine was dissolved while reacting under the irradiation of ultraviolet light at 365 nm and heating at 40° C.;

3. After the β-mercaptoethylamine was completely reacted, 2 times amount of the allyl acrylate were added in step 1, and step 1 was repeated;

4. 2 times amount of the β-mercaptoethylamine added in step 2 was added into the mixture, and step 2 was repeated;

5. 4 times amount of the allyl acrylate added in step 1 were added into the mixture, and step 1 was repeated;

6. 4 times amount of the β-mercaptoethylamine added in step 2 were added into the mixture, and step 2 was repeated;

After steps 1-6, a dendritic macromolecule with amino group as the terminal functional group was prepared.

Preparation of Dendritic Macromolecules with Acrylate Group as the Terminal Functional Group:

1. In DCM, the sample was weighted according to the ratio of isocyanoethyl acrylate to glycerin at 3:1 (molar ratio). 5 wt % of TEA was added, and the mixture was stirred and reacted overnight at room temperature. After being precipitated three times in n-hexane, the product was put into a vacuum oven to evaporate the solvent residue;

2. In DMSO, an equimolar amount of α-thioglycerol to isocyanatoethyl acrylate and 5 wt % of TEA was added. The mixture was stirred and reacted overnight at room temperature. The product was diluted with methanol and purified by precipitation using an excess amount of anhydrous diethyl ether 3. 2 times amount of the isocyanoethyl acrylate in step 1 were added into the mixture, and step 1 was repeated;

4. 2 times amount of the α-thioglycerol in step 2 were added into the mixture, and step 1 was repeated;

5. 4 times amount of the isocyanoethyl acrylate in step 1 were added into the mixture, and step 1 was repeated;

6. 4 times amount of the α-thioglycerol in step 2 were added into the mixture, and step 1 was repeated;

7. 8 times amount of the isocyanoethyl acrylate in step 1 were added into the mixture, and t step 1 was repeated.

After the above steps, a highly branched dendritic macromolecules with acrylate group as the terminal functional group was prepared.

Preparation of Topological Elastomer:

In DMSO, the prepared dendritic macromolecules with amino group and terminal acrylate group as the terminal functional groups were mixed according to a ratio of 1:2 (molar ratio). At the presence of 5 wt % of TEA as a catalyst, the mixture was stirred evenly. The mixture was poured into the mold and reacted for 2 h at 60° C. Then, the polymer was put into a vacuum oven to evaporate the solvent residue overnight. The modulus, strain at break, and elastic recovery of the resulting topological elastomer were 80 kPa, 1200%, 80%, respectively. The branched degree was 85%.

Example 4 (Post-Crosslinking, Micromolecules as Crosslinking Agent)

The raw materials and sources of Example 4 are shown in Table 4:

TABLE 4

The raw materials and sources

| Name | Chemical Formula | Manufacturer |
| --- | --- | --- |
| Triallylamine | $C_9H_{15}N$ | TCI (Shanghai) Development Co., Ltd. |
| β-Mercaptoethylamine | $C_2H_7NS$ | TCI (Shanghai) Development Co., Ltd. |
| Allyl acrylate | $C_6H_8O_2$ | Shanghai Aladdin Biochemical Technology Co., Ltd |
| 1,10-Decanedithiol | $C_{10}H_{22}S_2$ | TCI (Shanghai) Development Co., Ltd. |
| Triethylamine (TEA) | $C_6H_{15}N$ | TCI (Shanghai) Development Co., Ltd. |
| Photoinitiator 2959 | $C_{12}H_{16}O_4$ | TCI (Shanghai) Development Co., Ltd. |

Preparation of Dendritic Macromolecules with Allyl Group as the Terminal Functional Group:

1. The samples were weighed and mixed according to the ratio of triallylamine to allyl acrylate at 1:6 (molar ratio). In the presence of 5 wt % of TEA as a catalyst, the mixture was stirred evenly and reacted for 1 h;

2. Then, the same molar amount of β-mercaptoethylamine as the allyl acrylate, 1 wt % of photoinitiator 2959 was added into the mixture. The β-mercaptoethylamine was dissolved while reacting under the irradiation of ultraviolet light at 365 nm and heating at 40° C.;

3. After the β-mercaptoethylamine was completely reacted, add 2 times amount of the allyl acrylate added in step 1, and step 1 was repeated;

4. 2 times amount of the β-mercaptoethylamine added in step 2 were added into the mixture, and step 2 was repeated;

5. 4 times amount of the allyl acrylate in step 1 were added into the mixture, and step 1 was repeated;

After steps 1-5, a highly branched dendritic macromolecules with allyl group as the terminal functional group is prepared.

Preparation of Topological Elastomer:

0.25 times (molar amount) of 1,10-decanedithiol, 1 wt % of photoinitiator 2959 were added to the highly branched dendritic macromolecules with allyl group as the terminal functional group, and were stirred well. After flattening, crosslink curing under UV light at 365 nm for 1 min, a crosslinked topological elastomer was obtained. The modulus, strain at break, and elastic recovery of the resulting topological elastomer were 100 kPa, 800%, 75%, respectively. The branched degree was 80%.

Example 5 (Grafting)

The raw materials and sources of Example 5 are shown in Table 5:

TABLE 5

The raw materials and sources

| Name | Chemical Formula | Manufacturer |
| --- | --- | --- |
| Glycerol | $C_3H_8O_3$ | TCI (Shanghai) Development Co., Ltd. |
| Monothioglycerol | $C_3H_8O_2S$ | TCI (Shanghai) Development Co., Ltd. |
| 2-Isocyanatoethyl Acrylate | $C_6H_7NO_3$ | Shanghai Aladdin Biochemical Technology Co., Ltd |
| Acrylamide (AA) | $C_3H_5NO$ | J&K Scientific |
| 1,6-Hexanediol diacrylate (HDDA) | $C_{12}H_{18}O_4$ | J&K Scientific |
| N,N-Dimethylformamide (DMF) | $C_3H_7NO$ | Shanghai Aladdin Biochemical Technology Co., Ltd |
| Triethylamine (TEA) | $C_6H_{15}N$ | TCI (Shanghai) Development Co., Ltd. |
| Photoinitiator 2959 | $C_{12}H_{16}O_4$ | TCI (Shanghai) Development Co., Ltd. |

Preparation of Other Polymer Network:

1. The sample was weighted according to a ratio of AA to HDDA at 5:1 (molar ratio) and stir well;

2. 1 wt % of photoinitiator 2959 was added under the light-free condition and stirred well;

3. The mixture of precursor fluid was poured into the mold, and it was irradiated with UV light at 365 nm for 1 min for crosslink curing, thus obtaining the polymer precursor network.

Preparation of Topological Elastomer:

1. The dendritic macromolecules with acrylate group as the terminal functional group was prepared according to Example 3, and then the prepared polymer precursor network was immersed in the dendritic macromolecules for 1 h.

2. After the polymer network was fully swelled and unwound, 5 wt % of TEA was added. The mixture was stirred well and reacted at 60° C. for 1 hour. After the unreacted monomers were replaced by DMF, the polymer network was put into a vacuum oven to evaporate DMF, thus obtaining a topological elastomer.

The modulus, strain at break, and elastic recovery of the resulting topological elastomer were 100 kPa, 600%, 80%, respectively. The branched degree was 80%.

Example 6 (Copolymerization, Double Network Topological Elastomer)

The raw materials and sources of Example 6 are shown in Table 6:

TABLE 6

The raw materials and sources

| Name | Chemical Formula | Manufacturer |
|---|---|---|
| Glycerol | $C_3H_8O_3$ | TCI (Shanghai) Development Co., Ltd. |
| α-thioglycerol | $C_3H_8O_2S$ | TCI (Shanghai) Development Co., Ltd. |
| 2-Isocyanatoethyl acrylate | $C_6H_7NO_3$ | Shanghai Aladdin Biochemical Technology Co., Ltd |
| Hexamethylene diisocyanate (HDI) | $C_8H_{12}N_2O_2$ | J&K Scientific |
| Poly(tetramethyleneglycol) (PTMG) | $HO[C_4H_8O]_nH$ | J&K Scientific |
| Ditin butyl dilaurate (DBTDL) | $C_{32}H_{64}O_4Sn$ | J&K Scientific |
| Triethylamine (TEA) | $C_6H_{15}N$ | TCI (Shanghai) Development Co., Ltd. |
| Photoinitiator 2959 | $C_{12}H_{16}O_4$ | TCI (Shanghai) Development Co., Ltd. |

Preparation of Double Network Elastomer:

1. The dendritic macromolecules with acrylate group as the terminal functional group was prepared according to Example 3; then glycerol, PTMG, and HDI were added to the dendritic macromolecules with a ratio of 2:4:7 (molar ratio). The total mass ratio of the dendritic macromolecules and other reagents was equal;

2. 1 wt % of DBTDL and photoinitiator 2959 were added to the above mixture of precursor fluid and stirred well;

3. The precursor fluid was poured into the mold. The sample firstly reacted at 60° C. for 1 hour, and then are irradiated with 365 nm ultraviolet light for 1 min to crosslink curing, thus obtaining the double network elastomer.

The modulus, strain at break, and elastic recovery of the resulting topological elastomer were 200 kPa, 500%, 95%, respectively. The branched degree was 70%.

What is claimed is:

1. A method for preparing topological elastomers, wherein the topological elastomers comprise dendritic macromolecules, the method comprising
direct crosslinking, post-crosslinking, grafting, or copolymerization,
wherein the direct crosslinking refers to mixing all monomers and reacting the mixture of the monomers together, and a crosslinking reaction and a branched structure formation reaction are performed simultaneously, to obtain the topological elastomers directly; the post-crosslinking refers to synthesizing the dendritic macromolecules followed by crosslinking the dendritic macromolecules with a crosslinking agent to obtain the topological elastomers; the grafting refers to grafting of unreacted monomers or pre-prepared dendritic macromolecules into a polymer network to form the topological elastomers; the copolymerization refers to copolymerizing the unreacted monomers or the pre-prepared dendritic macromolecules with the polymer network to form the topological elastomers with a single network, a double network, or a interpenetrating network; wherein the dendritic macromolecules comprise terminal functional groups selected from the group consisting of allyl group, vinyl group, (meth) acrylate group, thiol group, epoxy group, carboxyl group, anhydride group, silicon-hydrogen bond, alkoxy group, and isocyanate group.

2. The method of claim 1, wherein the direct cros slinking comprises two orthogonal reactions that do not interfere with each other, wherein the two orthogonal reactions are independently selected from the group consisting of radical polymerization, cationic polymerization, anionic polymerization, and coordination polymerization.

3. The method of claim 1, wherein the cros slinking agents of the post-crosslinking are selected from the group consisting of micromolecule/macromolecule crosslinking agent, and the pre-prepared dendritic macromolecules for self-polymerization.

4. The method of claim 3, wherein reactions of the micromolecule/macromolecule cros slinking agent with dendritic macromolecules are selected from the group consisting of Michael addition reaction of thiol/amino-ene, amine/carboxyl/anhydride-epoxy reaction, amino/hydroxy-isocyanate reaction, hydrosilylation reaction, and esterification reaction; the self-polymerization of the pre-prepared dendritic macromolecules is selected from the group consisting of free radical self-polymerization, cationic self-polymerization, anionic self-polymerization, and coordination polymerization.

5. The method of claim 1, wherein the grafting are selected from the group consisting of grafting of unreacted monomers to the polymer network, wherein crosslinking and the dendritic macromolecules are performed simultaneously; and grafting of the pre-prepared dendritic macromolecules into the polymer network to form the topological elastomer.

6. The method of claim 5, wherein the polymer networks are selected from the group consisting of epoxy network, polyurethane network, silicone network, and polyacrylate network.

7. The method of claim 1, wherein the copolymerizing is selected from the group consisting of copolymerizing the unreacted monomers with the polymer network to form dendritic macromolecules; copolymerizing the prepared dendritic macromolecules with the polymer network to form the topological elastomer.

8. The method of claim 7, wherein the single network, the double network, or the interpenetrating network is formed by the copolymerization of the dendritic macromolecules and the polymer network; and a block network is formed by a stepwise copolymerization of the dendritic macromolecules and the polymer network.

9. A method for preparing topological elastomers, wherein the topological elastomers comprise dendritic macromolecules, the method comprising
direct crosslinking, or post-crosslinking,
wherein the direct crosslinking refers to mixing all monomers and reacting the mixture of the monomers together, and a crosslinking reaction and a branched structure formation reaction are performed simultaneously, to obtain the topological elastomers directly; the post-crosslinking refers to synthesizing the dendritic macromolecules followed by crosslinking the dendritic macromolecules with a crosslinking agent to obtain the topological elastomers;

wherein the dendritic macromolecules comprise terminal functional groups selected from the group consisting of allyl group, vinyl group, (meth)acrylate group, thiol group, epoxy group, carboxyl group, anhydride group, silicon-hydrogen bond, alkoxy group, and isocyanate group;

wherein the direct crosslinking comprises two orthogonal reactions that do not interfere with each other, wherein the two orthogonal reactions are independently selected from the group consisting of radical polymerization, cationic polymerization, anionic polymerization, and coordination polymerization.

10. The method of claim 9, wherein the crosslinking agents of the post-crosslinking are selected from the group consisting of micromolecule/macromolecule crosslinking agent, and the pre-prepared dendritic macromolecules for self-polymerization.

11. The method of claim 10, wherein reactions of the micromolecule/macromolecule crosslinking agent with dendritic macromolecules are selected from the group consisting of Michael addition reaction of thiol/amino-ene, amine/carboxyl/anhydride-epoxy reaction, amino/hydroxy-isocyanate reaction, hydrosilylation reaction, and esterification reaction; the self-polymerization of the pre-prepared dendritic macromolecules is selected from the group consisting of free radical self-polymerization, cationic self-polymerization, anionic self-polymerization, and coordination polymerization.

12. The method of claim 9, wherein, 0.01 wt % to 5 wt % of an initiator is added in the network of radical polymerization, cationic polymerization, and anion polymerization; and free radical polymerization requires the addition of photoinitiator or thermal initiator, and the polymerization is conducted under ultraviolet irradiation for 10 s to 10 min or heated to 80-120 ° C.; wherein the initiator is selected from dibenzoyl peroxide, or azodiisobutyronitrile.

13. The method of claim 9, wherein reactions of the micromolecule/macromolecule crosslinking agent with dendritic macromolecules are selected from the group consisting of Michael addition reaction of thiol/amino-ene, amine/carboxyl/anhydride-epoxy reaction; and wherein 0.01 wt % to 5 wt % of base catalyst is added to Michael addition reaction of thiol/amino-ene; the polymerization is conducted under 60-120 ° C.; and base catalyst is selected from triethylamine, 1,5,7-triazabicyclo[4.4.0]decane-5-ene, 1,8-diazabicyclo [5.4.0]undec-7-ene.

14. The method of claim 9, wherein the highly branched structure is prepared by a reaction of hydroxyl group with isocyanate group (Reaction Formula I), and the crosslinked network can be obtained by a radical polymerization reaction of (meth)acrylate group (Reaction Formula II)

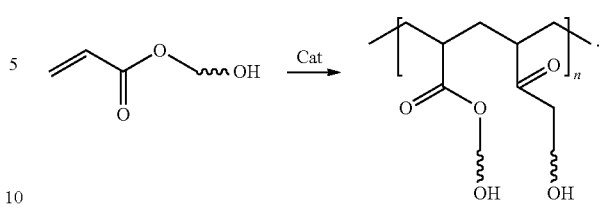

15. The method of claim 10, wherein the topological elastomers are obtained by reacting a dendritic macromolecule containing vinyl group, epoxy group, and silicon double bond with a micromolecule/macromolecule crosslinking agent containing thiol/amino group, amino group, and silicon hydroxyl group, respectively (Reaction formula III)

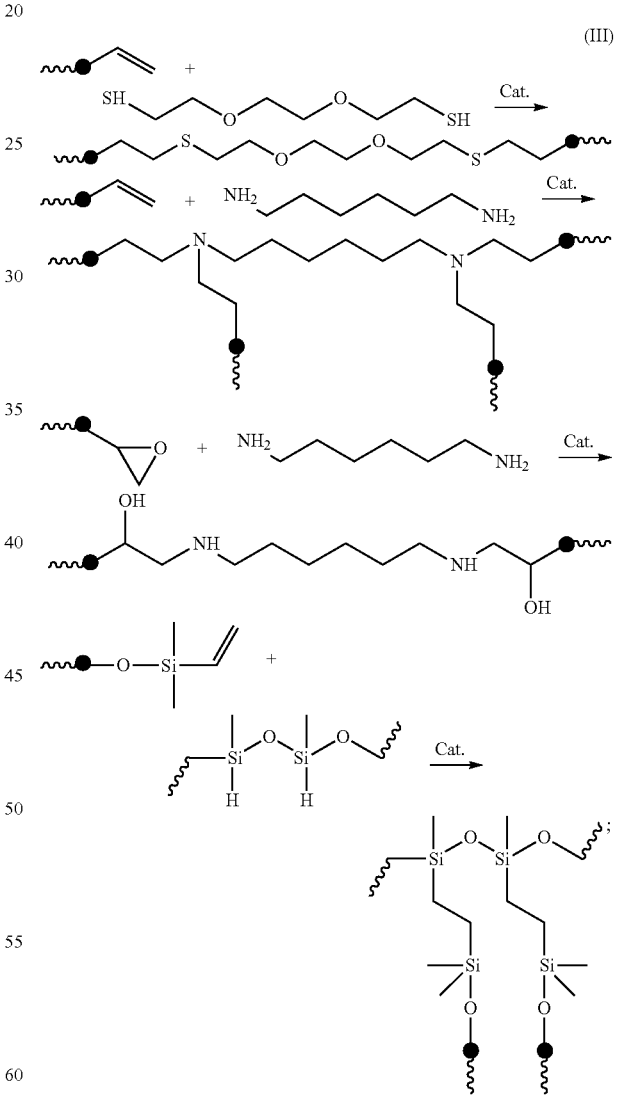

and
wherein 0.01 wt %-5 wt % of platinum catalyst should be added to the reaction of silicon double bond and silicon hydrogen group; and the polymerization is conducted thermally at 60-120° C.

16. The method of claim 10, wherein the topological elastomer is obtained by radical polymerization of the dendritic macromolecules containing (meth)acrylate group as the terminal functional group (Reaction formula IV)

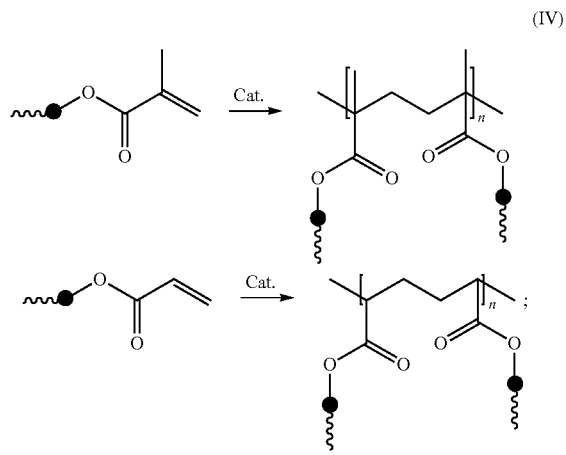

or
the topological elastomer is obtained by the reacting dendritic macromolecules with terminal functional groups of amino and acrylate groups, thiol and acrylate groups, amino and epoxy groups, respectively (Reaction Formula V)

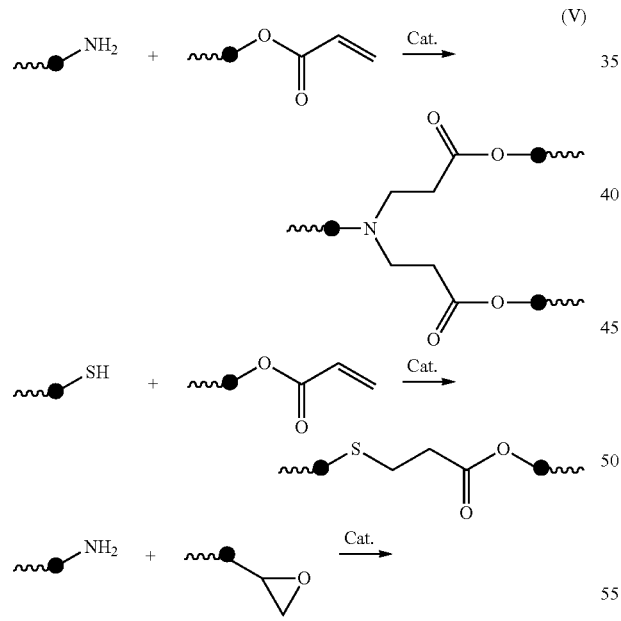

-continued

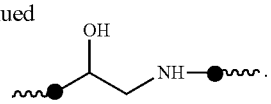

17. The method according to claim 1, wherein the method comprises direct crosslinking in the following steps:
weighing polycaprolactone triol (PCL), pentaerythritol triacrylate (PETA) and hexamethylene diisocyanate (HDI) according to the ratio of PCL: PETA: HDI=1: 0.5:1 (molar ratio), and dissolving them in butyl acetate;
adding 0.5 wt % of dibutyltin dilaurate (DBTDL) and 1 wt % of 2,2'-Azobis(2-methylpropionitrile) (AIBN) to form a mixture;
stirring evenly then pouring the mixture into a mold and reacting under 70° C. for 3 hours;
evaporating the solvent in a vacuum oven, and obtaining the crosslinked topological elastomer.

18. The method according to claim 1, wherein the method comprises post-crosslinking in the following steps:
(1) weighing and mixing triallylamine to allyl acrylate according to the ratio of 1:6 (molar ratio), and in the presence of 5 wt % TEA as a catalyst, stirring the mixture evenly and reacting for 1 hour;
(2) adding the same molar amount of β-mercaptoethylamine as the allyl acrylate, adding 1 wt % of a photoinitiator into the mixture, dissolving β-mercaptoethylamine while reacting under the irradiation of ultraviolet light at 365 nm and heating at 40° C.;
(3) after the β-mercaptoethylamine being completely reacted, adding 2 times amount of the allyl acrylate added in the step (1), and repeating the step (1);
(4) adding 2 times amount of the β-mercaptoethylamine added in the step (2) into the mixture, and repeating the step (2);
(5) adding 4 times amount of the allyl acrylate added in the step (1) into the mixture, and repeating the step (1);
(6) adding 4 times amount of the β-mercaptoethylamine in the step (2) into the mixture, and repeating the step (2);
(7) adding glycidyl methacrylate in an equimolar amount to β-mercaptoethylamine of the step (6) into the mixture, followed by reacting at 80° C. for 1 hour to obtain dendritic macromolecules with methacrylate group as the terminal functional group; and
(8) adding 1 wt % of the photoinitiator to the obtained dendritic macromolecules with methacrylate group as the terminal functional group; after being stirred uniformly, pouring the mixture into a mold, followed by crosslink curing under UV light at 365 nm for 1 minute to obtain the topological elastomer.

\* \* \* \* \*